United States Patent [19]

Spillman, Jr. et al.

[11] Patent Number: 4,547,262

[45] Date of Patent: Oct. 15, 1985

[54] METHOD FOR FORMING THIN FILM PASSIVE LIGHT WAVEGUIDE CIRCUIT

[75] Inventors: William Spillman, Jr., Charlotte, Vt.; Richard A. Soref, Newton Centre; Norman A. Sanford, Worcester, both of Mass.

[73] Assignee: Sperry Corporation, New York, N.Y.

[21] Appl. No.: 646,338

[22] Filed: Aug. 30, 1984

[51] Int. Cl.⁴ ............ H01L 21/306; C23F 1/02; B44C 1/22; G02B 5/14

[52] U.S. Cl. ............ 156/659.1; 29/569 L; 156/656; 156/657; 350/96.12; 427/85

[58] Field of Search ............ 29/569 L, 576 B; 357/17, 30; 372/46, 48; 350/96.1, 96.11, 96.12; 148/1.5, 187; 427/85, 162, 88; 156/653, 656, 657, 659.1, 661.1

[56] References Cited

U.S. PATENT DOCUMENTS 4,087,315  5/1978  Auracher et al. ............ 156/657 X
4,115,150  9/1978  Dyment ............ 156/662 X

*Primary Examiner*—William A. Powell
*Attorney, Agent, or Firm*—Howard P. Terry; Arnold L. Albin

[57] ABSTRACT

A thin film passive integrated optical waveguide is formed in a lithium tantalate substrate by proton exchange in a benzoic acid bath. Annealing the substrate provides increased waveguide depth and stabilizes the refractive index. Optical components are formed by proton exchange of the masked substrate after formation of a planar waveguide.

13 Claims, 3 Drawing Figures

METHOD FOR FORMING THIN FILM PASSIVE LIGHT WAVEGUIDE CIRCUIT

BACKGROUND OF THE INVENTION

1. Field of the Invention

The invention relates to a method of forming thin film passive integrated optical components by proton exchange of an optically transparent substrate in an acid bath followed by annealing to extend and stabilize regions of increased refractive index.

2. Description of the Prior Art

In a paper by Stewart B. Miller, Integrated Optics: An Introduction, BSTJ 48, 2059 (1969), it was suggested that dielectric waveguides could be formed in a substrate having a region of increased refractive index surrounded by a region of normal refractive index, with a difference in refractive of only 0.01. It was further suggested that combinations of optical elements could be formed in a planar waveguide using photolithographic techniques to provide integrated optical circuits.

Attempts to fabricate such structures were made by diffusion of titarium into a lithium niobate substrate. However, such structures with lithium niobate crystals are susceptable to optical damage and are therefore limited in dynamic range, since only low-power excitation beams may be applied. The index change with lithium niobate is of the order of 0.01, which requires a relatively long waveguide path and hence longer optical components. Moreover, the diffused guide structures support multimode polarization, and hence are unsuited where polarization control is required, as in low-loss optical switches with low crosstalk.

In the fabrication of waveguides and thin film optical components by localized modification of the refractive index of an optically transparent substrate, it has been demonstrated that a process using proton exchange in benzoic acid has been effective in forming optical waveguides in a lithium niobate substrate. The technique consists in emersing x-cut or z-cut $LiNbO_3$ substrates into a molten bath of benzoic acid at a fixed temperature between the melting point and boiling point of the benzoic acid for a predetermined period of time which varies according to the required thickness for the guiding layer and the desired ultimate refractive index profile. The waveguides so obtained have been found to have a step-like index profile with a maximum increase in the extraordinary index $n_E$ of 0.12 at $\lambda = 633$ nm, no change being observed in the ordinary index $n_O$. Such devices offer advantages over similar structures fabricated by the diffusion of titanium, in that their fabrication is quicker and more economical, provides a greater index change $\Delta n_E$, and can be adapted to single-mode propagation. In consequence, optical devices, such as waveguides with bends of short radii, lenses, and reflectors which are impractical with the diffused structures, become realizable with proton exchange. Annealing can be used to convert the step-index profile obtained with proton exchange to a parabolic shaped gradient-index profile having a reduced value of $n_E$ at the substrate surface but providing an increased guide depth for matching to fiber-optic cables. However, the proton-exchanged $LiNbO_3$ structures have suffered from instability, showing significant changes in refractive index in periods as short as one day over several months.

Single-crystal $LiTaO_3$ is, in many respects, a more attractive substrate material for integrated-optic applications than $LiNbO_3$. A comparison of $LiTaO_3$ with $LiNbO_3$ reveals that $LiTaO_3$ is less susceptible to optical damage, has a smaller birefringence, is harder, and is easier to polish. The electro-optic coefficients of the two materials are essentially the same. Single-crystal $LiTaO_3$ is a stable, pure, highresistivity material, available in high optical quality. Yet, in the past, the diffusion of metal ions (such as $Ti^+$) into $LiTaO_3$ to create optical waveguides has been "thermally forbidden" because the required diffusion temperatures are higher than the Curie temperature of $LiTaO_3$. This is not a problem with the proton exchange process due to the relatively low temperatures at which it occurs ($<250°$ C.). Heretofore, extending the process to produce waveguides in $LiTaO_3$ has not been demonstrated.

SUMMARY OF THE INVENTION

The invention is directed to a method of forming a light waveguide in an optical substrate. The waveguide may include arcuate bends, lenses, reflectors, refractors, gratings, or other optical components. Further, the method of this invention utilizes a controlled proton exchange process followed by annealing to provide waveguide components of relatively high extraordinary index of refraction. The high temperatures of annealing and deposition operating on a lithium tantalate substrate provide optical components of high quality and stability.

The method by which the light waveguide components are formed comprises providing an optical substrate comprised of $LiTaO_3$ having a predetermined index of refraction with a pattern of masking material on at least one major planar surface of the substrate so as to expose a limited surface area of the substrate. A plurality of hydrogen ions is diffused into the exposed surface area by a proton exchange process so as to effect an increase in the extraordinary index of refraction in the predetermined exposed areas thereby forming optical waveguide components with an index profile having a predetermined planar pattern at the surface and a predetermined depth. The diffusion stage is followed by a high temperature exposure at a sufficient time period to reduce the refractive index to a predetermined value while increasing the profile depth.

In a preferred embodiment, prior to formation of the optical components a planar waveguide is diffused into the surface of the substrate by proton exchange, followed by annealing to provide a predetermined region of increased extraordinary index of refraction. A subsequent masking and proton exchange followed by annealing permits defining discrete optical components interconnected by light waveguides, thereby forming an integrated thin film optical circuit.

DESCRIPTION OF THE PREFERRED EMBODIMENT

The present invention provides a method for fabrication of optical waveguides and integrated optical circuitry in LiTaO$_3$ using a combination of the proton exchange process and annealing. The use of proton exchange to form optical waveguides in LiTaO$_3$ has demonstrated a relatively simple process through which low loss integrated optic devices of high stability may be created. Unexpectedly, this process provides an increased refractive index as high as 0.14 along a preferred optical axis.

It has also been found that proton mobility in LiTaO$_3$ is apparently much less than in LiNbO$_3$, indicating that guides made by proton exchange in LiTaO$_3$ would be more stable than those using LiNbO$_3$ as a substrate.

Figure 1:
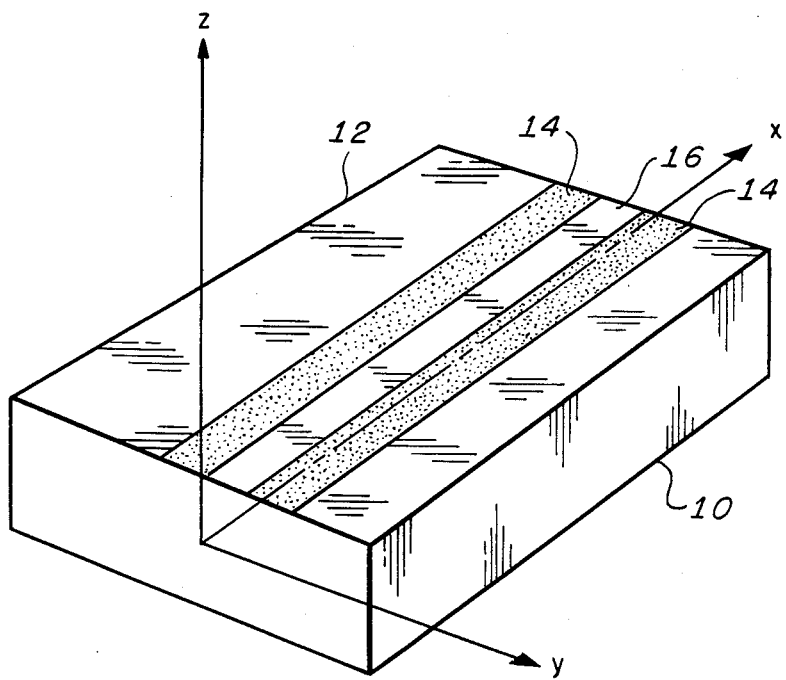
FIG. 1 is a schematic perspective illustration of a light waveguide circuit according to an embodiment of the present invention.

FIG. 1 shows a perspective view of an optically transparent substrate 10. The substrate 10 is formed from a crystal which is preferably of the z-cut type although an x-cut may be used for simple waveguide structures. Preferably it is provided with a planar surface 12 along the x—y plane on which an acid resistant mask 14 (typically, but not necessarily a metal alloy, such as gold-chromium) has been deposited to define the optical structure.

According to a preferred method of this invention, a zone of increased refractive index 16 is formed on planar surface 12 by selective reaction of the substrate 10 with a weak acid such as benzoic acid. This is followed by heating the crystal to transform the step index profile produced by the benzoic acid reaction to a gradient-index profile having a lowered value of refractive index at the guide surface. This reaction is carried out by the method to be described.

Prior to immersion in a benzoic acid melt, a pattern of masking material is formed on at least one major planar surface of the substrate, which has been cleaved along the x—y plane, such as surface 12, which pattern may be formed by conventional photolithographic processes, so as to expose a limited surface area of the substrate, such as the waveguide channel 16. The surface 12 may be patterned so as to form a multiplicity of channels similar to channel 16, and may also include optical components such as lenses, reflectors, prisms, and defraction gratings. For example, the mask may be formed with a 100 Å flash of Cr, followed by 500 Å of Au, with 10 μm wide channels. Smaller channels may be defined with suitable pattern projection apparatus. As will be shown below, these elements may be combined to form an integrated structure of optical components.

It is essential that the process provide a sufficient quantity of hydrogen ions to effect an increase in the extraordinary component of the refractive index in the unmasked area of the substrate, thereby forming the desired optical waveguide. The ordinary index of refraction, $n_O$, is substantially unaffected by this process. The result is a substantially uniform region of increased refractive index $n_E$ which tends to guide any light waves introduced into the substrate at the planar surface 12. Once the channel of waveguide 16 has reached a predetermined depth at a desired extraordinary index of refraction, the process is terminated. After reaction the masking layer may be stripped or, if a conductive mask has been deposited, retained for formation of an electrode pattern. The resulting step index profile is shown as curve 22 of FIG. 2.

The proton exchange may be conducted with the melt in a temperature range of 122° C.–249° C. for a period of about two to five hours. Because the resulting waveguide lacks sufficient depth to propagate light waves therein, the substrate must be subjected to an annealing process which results in a transformation of the step-index profile to a gradient-index profile having a lowered value of $n_E$ at the guide surface and an increased depth. Such a characteristic is shown at line 24 of FIG. 2. Characteristically, the guide depth before annealing would be of the order of 0.5 μm, and after annealing as much as 5 μm. The annealing is preferably carried out for a period of six or more hours at a temperature of the order of 250° C. In one embodiment, annealing at 250° C. for 18 hours followed by further annealing for 17 hours at 325° C. provided a guide of 5–10 μm in depth, of approximately circular cross section.

Figure 2:
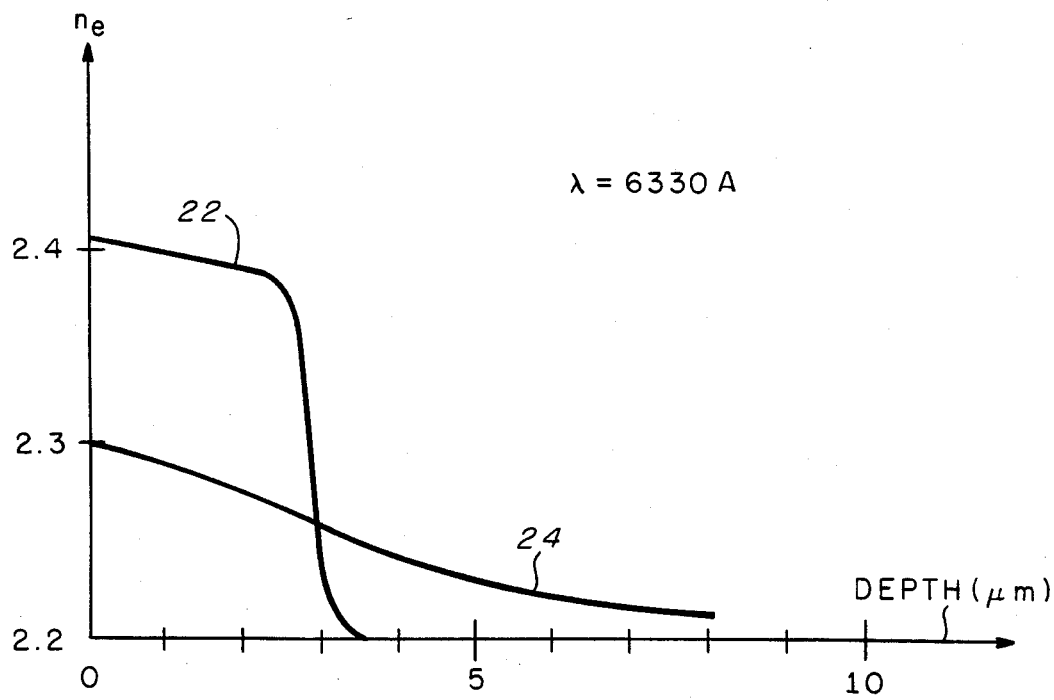
FIG. 2 shows a step-index profile as modified by a subsequent annealing.

Beneficially, the annealing process, as shown in FIG. 2, provides a stable resultant index of refraction in the guiding zone that is significantly increased over the untreated area of the substate. While other weak acids such as palmitic acids and other temperature ranges and time durations for proton exchange and annealing may be suitable, the benzoic acid process described is preferable because of its relatively high penetration speed without degradation of the crystal structure. Other annealing temperatures and time periods may be acceptable, so long as the Curie temperature of the substrate is not exceeded. Essential to the success of the method reported, however, is the use of the LiTaO$_3$ substrate whose advantageous properties in this process have not heretofore been recognized.

Figure 3:
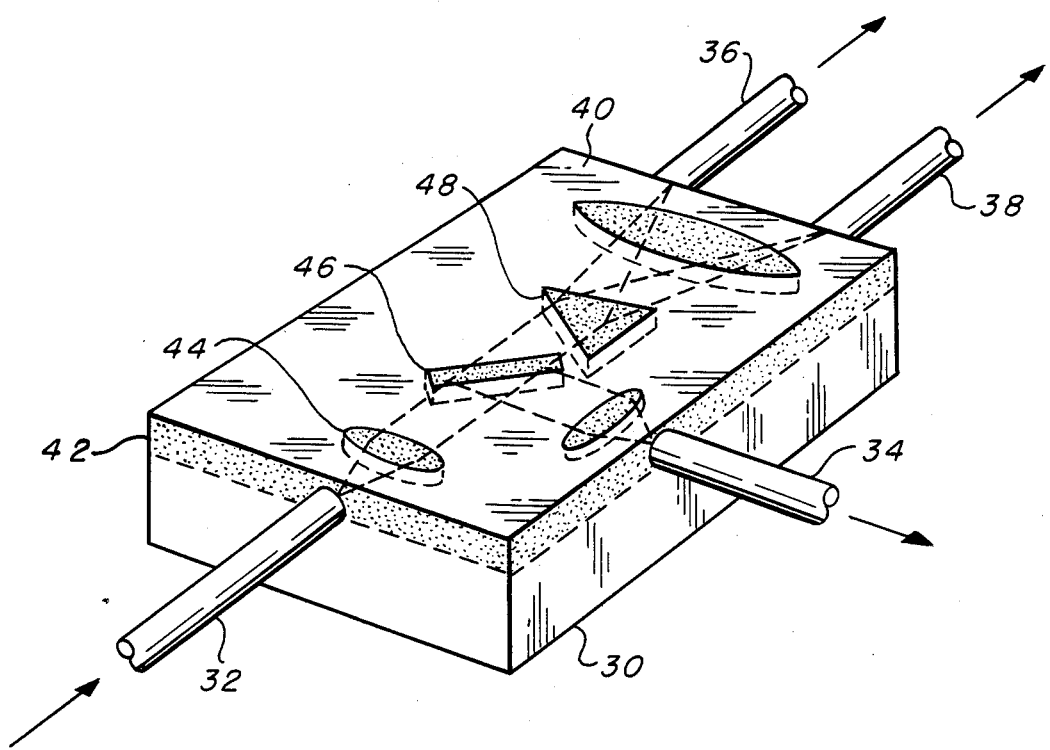
FIG. 3 is a schematic perspective illustration of a further embodiment of the invention, showing the implementation of optical components in an integrated circuit.

The process described above is readily adaptable to forming a complex integrated optical circuit as well as simple waveguides. For example, FIG. 3 shows a substrate 30 provided with fiber-optic guides 32, 34, 36, 38. Guide 32 may be used for the introduction of a lighting comprised of multiple wave-lengths which can be separated for analysis by a prism structure 48 to provide outputs on fiber optic cables 36 and 38. Similarly, fiber optic cable 34 may be used to introduce a further optical beam component, or to extract a portion of the energy introduced into the system or fiber 32 for monitoring purposes. The structure of FIG. 3 is obtained by initially exposing a z-cut substrate 30 having a major planar surface 40 to a benzoic acid bath. Preferably, the substrate would be exposed for less than two hours at about 249° C. This results in a substantially uniform zone 42 of increased refractive index across the planar surface 40. The substrate is then annealed at 250° C. for 5–6 hours to transform the first formed step-index profile obtained with the proton exchange to a gradient-index profile having a lowered index of refraction at the surface 40. This forms a planar waveguide defining a region of increased index of refraction throughout the surface 40 with a predetermined depth sufficient for light wave propagation in the TE mode. Surface 40 is then patterned, as by conventional photolithographic processes in which the mask provides for conventional optical shapes such as a lens 44, mirror 46, prism 48 or defraction grating (not shown). The mask may comprise a conductive film such as an alloy of chromium and gold, aluminum, or a nonconductive dielectric material such as SiO$_2$ so as to define regions of increased refractive index. If a conductive film is used it may serve both as the waveguide proton-exchange mask and as an electrode structure. The system is then again exposed to a benzoic acid bath for at least 5 hours at 249° C. By virtue of the differentiation in the period of submersion in the acid bath and duration of the subsequent annealing, the zones of optical devices 44-48 may be preferentially defined so as to provide regions of increased refractive index over that of the layer 42, with layer 42 acting to guide light waves between the optical components. By suitable variation of the exposure and annealing times, the depth of the optical components may be advantageously defined to provide either single mode or multimode propagation. Beneficially, the structure shown has been found to guide TE polarizations but not transmit TM polarizations. Thus, the apparatus may also be configured for single mode operation as is known in the art.

Only a z-cut crystal may be used in the integrated circuit of FIG. 3 so as to assure that the light energy propagates only in the planar layer.

Thus it may be seen that through the use of the proton exchange technique, large index changes can be created in the lithium tantalate substrate. Combining this technique with annealing, and replicating the steps as desired, allows the creation of a multiplicity of thin-film integrated optic components. The resultant waveguides and optical elements are highly stable and the unexpectedly large increase in the extraordinary component of refractive index permits fabricating these elements with small radii of curvature.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A method for the formation of an optical component in a planar optical substrate having a predetermined index of refraction, comprising the steps of:

providing a substrate comprised of $LiTaO_3$, cleaving said substrate to provide a major planar surface along the x—y plane, forming a predetermined pattern of masking material on said major planar surface, said pattern exposing a limited surface area of said substrate, diffusing into said limited surface area by proton exchange a plurality of hydrogen ions in a quantity sufficient to effect an increase in a component of said refractive index in said area, thereby forming said optical component with an index profile having a predetermined planar pattern at said surface, a predetermined depth, and a first region of predetermined extraordinary index of refraction, and providing thermal energy to said substrate for a sufficient period of time to effect a predetermined reduction in said index component and a predetermined increase in said profile depth.

2. The method as set forth in claim 1, wherein said proton exchange is provided by immersion of said substrate in a heated acid bath for a predetermined time period.

3. The method as set forth in claim 1, wherein said masking material is selected from the group consisting of alloys of chromium, gold or aluminum.

4. The method as set forth in claim 1, wherein said masking material is comprised of a nonconductive dielectric.

5. The method as set forth in claim 5, wherein said masking material is comprised of an oxide of silicon.

6. The method as set forth in claim 2, wherein said acid bath comprises benzoic acid.

7. The method of claim 6, wherein said bath is heated between 122° C. and 249° C.

8. The method as set forth in claim 7, wherein said predetermined time period is about 2 hours.

9. The method as set forth in claim 8, wherein said acid bath is heated to about 249° C.

10. The method as set forth in claim 9, wherein said thermal energy comprises annealing said substrate at about 250° C. for about 18 hours.

11. The method as set forth in claim 10, comprising the additional step of annealing said substrate for about 17 hours at about 325° C.

12. A method for forming an integrated light waveguide circuit in an optical substrate having a first index of refraction, comprising the steps of:

providing a substrate of $LiTaO_3$, cleaving said substrate to provide a major planar surface along an x—y plane, exposing said major surface to an acid bath for a first predetermined time period at a first predetermined temperature, annealing said substrate for a second predetermined time period at a second predetermined temperature to form a planar region having a second index of refraction greater than said first index of refraction and a predetermined depth.

forming an etch resistant mask and selectively patterning said major surface to define regions of predetermined optical geometry, and exposing said major surface to said acid bath for a third predetermined time period exceeding said first predetermined time period, said third period being of sufficient duration to provide said regions of predetermined optical geometry with a third refractive index and a depth substantially equal to said predetermined depth of said planar region.

13. The method as set forth in claim 12, wherein said acid bath is comprised of benzoic acid, said first predetermined temperature is about 249° C., said first predetermined time period is less than about 2 hours, said second predetermined time period is at least 18 hours, said second predetermined temperature is about 249° C., and said third predetermined time period is greater than about 5 hours.

* * * * *